United States Patent
Teranishi et al.

(10) Patent No.: US 9,021,837 B2
(45) Date of Patent: May 5, 2015

(54) METHOD OF CLEAVING AND SEPARATING A GLASS SHEET AND APPARATUS FOR CLEAVING AND SEPARATING A GLASS SHEET

(71) Applicant: Nippon Electric Glass Co., Ltd., Shiga (JP)

(72) Inventors: Yasuo Teranishi, Shiga (JP); Yasuhiro Matsumoto, Shiga (JP); Michiharu Eta, Shiga (JP); Takahide Fujii, Shiga (JP); Naotoshi Inayama, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 212 days.

(21) Appl. No.: 13/712,001

(22) Filed: Dec. 12, 2012

(65) Prior Publication Data

US 2013/0167590 A1 Jul. 4, 2013

(30) Foreign Application Priority Data

Dec. 12, 2011 (JP) ................. 2011-271286

(51) Int. Cl.
*C03B 33/02* (2006.01)
*C03B 33/033* (2006.01)
*C03B 33/09* (2006.01)

(52) U.S. Cl.
CPC ........... *C03B 33/0222* (2013.01); *C03B 33/033* (2013.01); *C03B 33/091* (2013.01)

(58) Field of Classification Search
CPC .... C03B 33/02; C03B 33/022; C03B 33/023; C03B 33/03; C03B 33/033; C03B 33/091; C03B 33/10
See application file for complete search history.

(56) References Cited

U.S. PATENT DOCUMENTS

2004/0020960 A1 2/2004 Hauer et al.

FOREIGN PATENT DOCUMENTS

| JP | 2002-338284 | | 11/2002 |
| JP | 2004-506588 | | 3/2004 |
| JP | 2006-256944 | | 9/2006 |
| JP | 2007035912 A | * | 2/2007 |

OTHER PUBLICATIONS

International Search Report mailed Mar. 19, 2013 in International (PCT) Application No. PCT/JP2012/082164.
International Preliminary Report on Patentability and Written Opinion of the International Searching Authority issued Jun. 26, 2014 in International (PCT) Application No. PCT/JP2012/082164.

* cited by examiner

*Primary Examiner* — Queenie Dehghan
(74) *Attorney, Agent, or Firm* — Wenderoth, Lind & Ponack, L.L.P.

(57) ABSTRACT

A method of cleaving and separating a glass sheet includes a cleaving step of cleaving a glass sheet along preset cleaving lines by a laser cleaving method, and a separation step of separating adjacent pieces of the cleaved glass sheet from each other. The cleaving step is performed under a state in which the glass sheet is placed on support members provided respectively in segment regions, which are segmented by the preset cleaving lines. The separation step is performed by separating the support members from each other in adjacent segment regions.

10 Claims, 4 Drawing Sheets

METHOD OF CLEAVING AND SEPARATING A GLASS SHEET AND APPARATUS FOR CLEAVING AND SEPARATING A GLASS SHEET

TECHNICAL FIELD

The present invention relates to a technology for cleaving a glass sheet by a laser cleaving method and then separating pieces of the glass sheet from each other.

BACKGROUND ART

In a process of manufacturing glass sheet products as typified by glass substrates for a plasma display panel (PDP), a field emission display (FED), an electroluminescent display (ELD), and the like, a small-area glass sheet is cut out of a large-area glass sheet and an edge portion extending along each side of the glass sheet is trimmed off. As a method therefor, a method of cleaving a glass sheet is taken as an example.

In this case, a laser cleaving method is taken as one method of cleaving a glass sheet, and for example, this technology is disclosed in Patent Literature 1 described below.

Patent Literature 1 discloses a technology of cleaving a glass sheet by the laser cleaving method in the following manner. That is, an absorption coefficient of the glass sheet for a laser beam is controlled, and the laser beam is caused to pass through a material in a range of the overall thickness thereof, or to pass through the material in a range of up to a sufficient depth even when the laser beam is not caused to pass in the range of the overall thickness. Accordingly, an initial crack formed in an end surface of the glass sheet propagates due to a thermal stress in the range of the overall thickness of the glass sheet.

According to the technology disclosed in Patent Literature 1 described above, the positional accuracy of the cleaving can be enhanced and the cleaving speed can be increased. Thus, this technology produces various advantages as compared to a conventional method of mechanically cleaving a glass sheet through use of a diamond cutter or the like.

CITATION LIST

Patent Literature

Patent Literature 1: JP 2006-256944 A

SUMMARY OF INVENTION

Technical Problem

Even in the laser cleaving method having excellent characteristics as described above, however, the following problem is inherent due to the fact that opposing cleaved surfaces of the pieces of the cleaved glass sheet are held in proximity to each other.

Specifically, in a case of picking up the pieces of the cleaved glass sheet from a working table for cleaving so as to transfer the pieces of the glass sheet into the subsequent steps, a scratch or a fracture may occur in the cleaved surfaces due to collision and sliding between the cleaved surface of the piece of the glass sheet that is being picked up and the cleaved surface of the piece of the glass sheet that is placed on the working table. As a result, the quality of the glass sheet may be degraded.

Therefore, when transferring the pieces of the cleaved glass sheet, it is necessary to avoid the collision and sliding between the opposing cleaved surfaces of the pieces of the glass sheet, but in actuality, there is no measure taken against the need described above.

The present invention has been made in view of the above-mentioned circumstances, and therefore has a technical object to avoid collision and sliding between cleaved surfaces of pieces of a glass sheet cleaved by a laser cleaving method, thereby preventing a scratch, a fracture, or the like in the cleaved surfaces and eliminating factors of degradation in quality of the glass sheet.

Solution to Problem

As a method devised to solve the above-mentioned problem, according to the present invention, there is provided a method of cleaving and separating a glass sheet, the method comprising: a cleaving step of cleaving the glass sheet along a preset cleaving line by a laser cleaving method; and a separation step of separating adjacent pieces of the cleaved glass sheet from each other, wherein the cleaving step is performed under a state in which the glass sheet is placed on support members provided respectively in segment regions, which are segmented by the preset cleaving line, and the separation step is performed by separating the support members from each other in adjacent segment regions. The phrase "separating from each other" herein refers not only to a case where the support members move in opposite directions, but also to a case where the support members move along different paths to increase the distance therebetween, a case where one support member moves in a direction away from another stationary support member, and a case where the distance between two support members moving in the same direction is increased.

According to this method, in the cleaving step, the glass sheet is cleaved by the laser cleaving method on the support members in the respective segment regions, and then in the separation step, the support members for respectively supporting the pieces of the cleaved glass sheet are separated from each other in the adjacent segment regions so that cleaved surfaces of the pieces of the glass sheet are separated from each other. Accordingly, even in a case of picking up the respective pieces of the cleaved glass sheet from the support members so as to transfer the pieces of the cleaved glass sheet into the subsequent steps, collision and sliding between the cleaved surfaces can be avoided effectively. As a result, a scratch or a fracture can be prevented in the cleaved surfaces of the pieces of the glass sheet, and accordingly the factors of degradation in quality of the glass sheet can be eliminated appropriately.

In the above-mentioned method, the preset cleaving line may comprise: a preset transverse cleaving line for forming a transversely cleaved portion extending in a transverse direction of the glass sheet; and a preset longitudinal cleaving line for forming a longitudinally cleaved portion extending in a longitudinal direction of the glass sheet that is orthogonal to the transverse direction. The term "cleaved portion" herein refers to a portion at which the opposing cleaved surfaces of the pieces of the glass sheet are held in proximity to or abutment against each other through the cleaving of the glass sheet.

With this structure, rectangular pieces of the cleaved glass sheet can be obtained, and hence a glass sheet having high frequency of use can be obtained.

In the above-mentioned method, after the cleaving step is performed along the preset transverse cleaving line, the separation step may be performed for the transversely cleaved portion, and then, after the cleaving step is performed along the preset longitudinal cleaving line, the separation step may be performed for the longitudinally cleaved portion.

With this structure, the cleaved surfaces of the pieces of the glass sheet, which is cleaved by the laser cleaving method in the cleaving step along the preset transverse cleaving line, are brought into a state of being separated from each other in the separation step for the transversely cleaved portion. Accordingly, a predetermined clearance is generated between the opposing cleaved surfaces of the pieces of the glass sheet. The clearance is utilized effectively when an initial crack serving as a start point of laser cleaving along the preset longitudinal cleaving line is formed in an end surface of each piece of the cleaved glass sheet. Therefore, the cleaving step for each piece of the glass sheet along the preset longitudinal cleaving line can be performed smoothly, and thus the workability is enhanced.

In the above-mentioned method, after the cleaving step is performed along the preset transverse cleaving line, the cleaving step may be performed along the preset longitudinal cleaving line, and then the separation step for the transversely cleaved portion and the separation step for the longitudinally cleaved portion may be performed.

With this structure, for example, the separation step for the transversely cleaved portion and the separation step for the longitudinally cleaved portion can be performed simultaneously, and in particular, the workability of the separation step can be enhanced efficiently.

In the above-mentioned method, it is preferred that the support members comprise suction means capable of performing and canceling suction of the glass sheet.

With this structure, at the time of the separation step, the pieces of the glass sheet are sucked against the support members, and hence slip is less liable to occur in the abutment surfaces between the pieces of the glass sheet and the support members, which enhances the followability of the movement of the pieces of the glass sheet with respect to the movement of the support members. Accordingly, the effect of separating the cleaved surfaces of the pieces of the glass sheet can be enhanced when separating the support members provided in the adjacent segment regions. Further, sliding is less liable to occur in the abutment surfaces between the pieces of the glass sheet and the support members, and hence a scratch or the like is not easily generated in the surfaces of the pieces of the glass sheet, with the result that the degradation in quality of the glass sheet can be prevented more effectively.

The above-mentioned method may further comprise tilting a support surface, which supports any one of the pieces of the glass sheet, in a part of the support members with respect to a horizontal plane, to thereby drop and discard a part of a plurality of pieces of the cleaved glass sheet from any one of the support members, wherein the tilting succeeds the separation step.

With this structure, when any piece of the glass sheet which cannot be used as a product is present in the part of the plurality of the pieces of the cleaved glass sheet due to, for example, a thick selvage portion formed in that piece, the piece of the glass sheet is dropped from the support member, and can therefore be discarded quickly.

Further, as an apparatus devised to solve the above-mentioned problem, according to the present invention, there is provided an apparatus for cleaving and separating a glass sheet, the apparatus being configured to cleave the glass sheet along a preset cleaving line by a laser cleaving method, and separate adjacent pieces of the cleaved glass sheet from each other, the apparatus comprising support members for supporting the glass sheet, the support members being provided respectively in segment regions, which are segmented by the preset cleaving line, the support members being separable from each other in adjacent segment regions. The phrase "separating from each other" herein refers not only to a case where the support members move in opposite directions, but also to a case where the support members move along different paths to increase the distance therebetween, a case where one support member moves in a direction away from another stationary support member, and a case where the distance between two support members moving in the same direction is increased.

With this structure, it is possible to obtain actions and effects similar to those described on the above-mentioned method of cleaving and separating a glass sheet.

In the above-mentioned structure, it is preferred that the preset cleaving line comprise: a preset transverse cleaving line for forming a transversely cleaved portion extending in a transverse direction of the glass sheet; and a preset longitudinal cleaving line for forming a longitudinally cleaved portion extending in a longitudinal direction of the glass sheet that is orthogonal to the transverse direction. The term "cleaved portion" herein refers to a portion at which the opposing cleaved surfaces of the pieces of the glass sheet are held in proximity to or abutment against each other through the cleaving of the glass sheet.

With this structure, it is possible to obtain actions and effects similar to those described on the above-mentioned method of cleaving and separating a glass sheet.

In the above-mentioned structure, the apparatus may further comprise: a transverse guide rail for guiding movement of each of the support members in a direction along the preset transverse cleaving line; a guide rail support body fixed to the transverse guide rail; and a longitudinal guide rail for guiding movement of the guide rail support body in a direction along the preset longitudinal cleaving line.

With this structure, when separating the respective pieces of the glass sheet cleaved at the transversely cleaved portion, the support members which support the respective pieces of the glass sheet only need to be guided and moved along the longitudinal guide rail through the intermediation of the guide rail support body. Further, when separating the respective pieces of the glass sheet cleaved at the longitudinally cleaved portion, the support members which support the respective pieces of the glass sheet only need to be guided and moved along the transverse guide rail. Further, when separating, in the transverse and longitudinal directions, the respective pieces of the glass sheet cleaved at both the transversely cleaved portion and the longitudinally cleaved portion, the support members which support all the pieces of the glass sheet and the guide rail support body fixed to the transverse guide rail can be guided and moved simultaneously along the transverse guide rail and the longitudinal guide rail. Thus, the working efficiency can be enhanced.

In the above-mentioned structure, the each of the support members may be provided to a robot for separating the support members from each other in the adjacent segment regions.

With this structure, the movement of the support members can be automated, and hence the production efficiency can be enhanced.

In the above-mentioned structure, it is preferred that the support members comprise suction means capable of performing and canceling suction of the glass sheet.

With this structure, it is possible to obtain actions and effects similar to those described on the above-mentioned method of cleaving and separating a glass sheet.

In the above-mentioned structure, the apparatus may be configured to be capable of tilting a support surface, which supports any one of the pieces of the glass sheet, in a part of the support members with respect to a horizontal plane.

With this structure, it is possible to obtain actions and effects similar to those described on the above-mentioned method of cleaving and separating a glass sheet.

Advantageous Effects of Invention

As described above, according to the present invention, when the glass sheet is cleaved by the laser cleaving method and the pieces of the cleaved glass sheet are separated from each other, a scratch or a fracture can be prevented in the cleaved surfaces of the respective pieces of the cleaved glass sheet, and accordingly the degradation in quality of the glass sheet can be suppressed.

DESCRIPTION OF EMBODIMENTS

In the following, an apparatus for cleaving and separating a glass sheet according to an embodiment of the present invention is described with reference to FIGS. 1 to 3 in the accompanying drawings.

Figure 1:
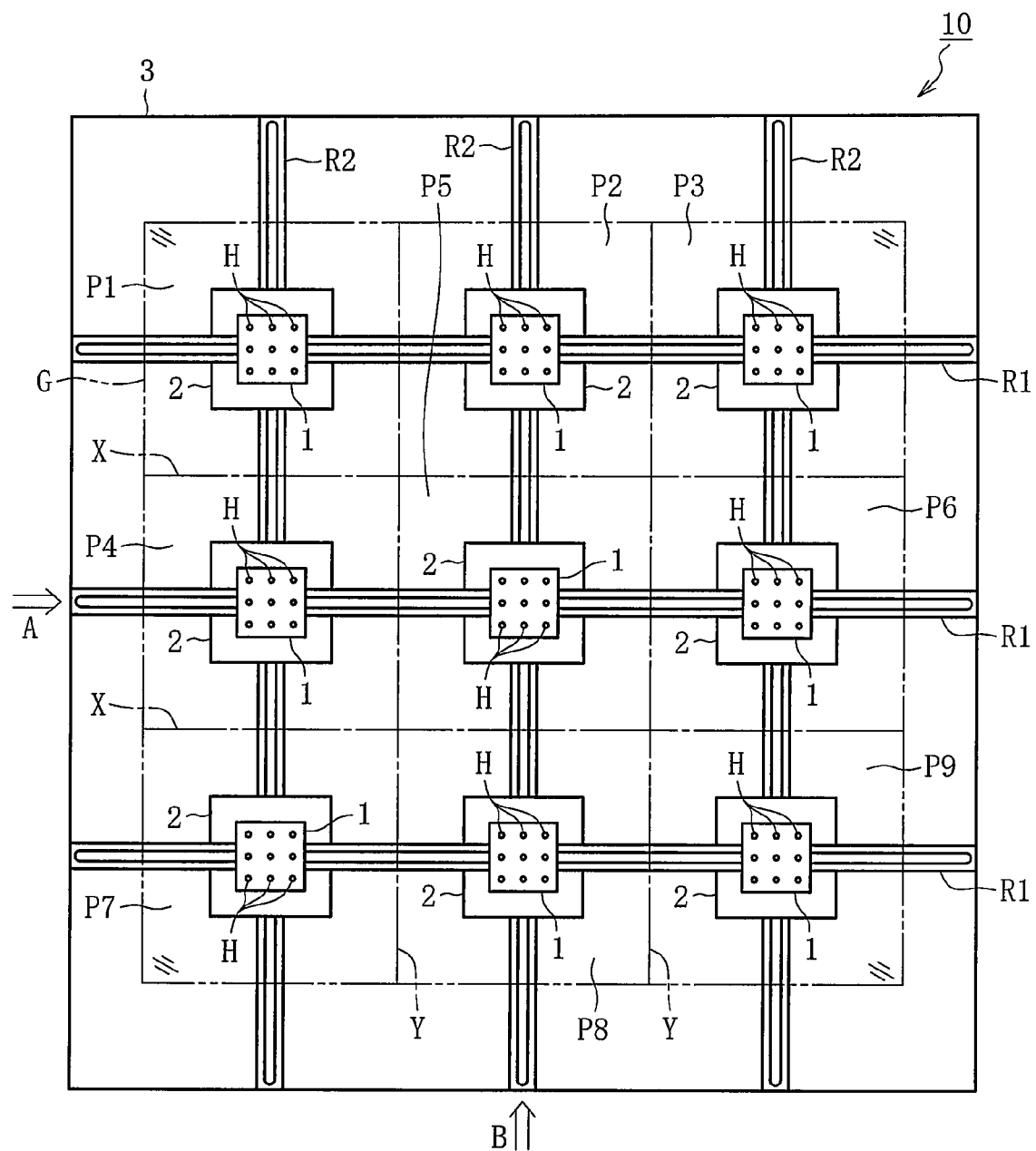
FIG. 1 A plan view illustrating an apparatus for cleaving and separating a glass sheet according to an embodiment of the present invention.

FIG. 1 is a plan view illustrating the apparatus for cleaving and separating a glass sheet (hereinafter referred to simply as "cleaving and separating apparatus") according to the embodiment of the present invention. As illustrated in FIG. 1, a cleaving and separating apparatus 10 comprises nine support members 1 for supporting a glass sheet G from the bottom thereof in segment regions P1 to P9, respectively, which are segmented by preset transverse cleaving lines X and preset longitudinal cleaving lines Y of the glass sheet G. Further, the cleaving and separating apparatus 10 comprises three transverse guide rails R1 for guiding and moving the respective support members 1, nine guide rail support bodies 2 which are separately fixed to the respective transverse guide rails R1 in units of three guide rail support bodies 2, and three longitudinal guide rails R2 for guiding and moving the respective guide rail support bodies 2. The longitudinal guide rails R2 are fixed to a base 3 which is a base part of the cleaving and separating apparatus 10.

Further, as illustrated in FIG. 1, a plurality of air holes H for sucking the glass sheet G are formed in an abutment surface (support surface) of each support member 1 against the glass sheet G. The glass sheet G can be sucked by applying a negative pressure to the glass sheet through the air holes H from a negative pressure source (not shown).

Further, the transverse guide rails R1 are provided in parallel to the preset transverse cleaving lines X, and the longitudinal guide rails R2 are provided in parallel to the preset longitudinal cleaving lines Y. Therefore, the transverse guide rails R1 and the longitudinal guide rails R2 are orthogonal to each other.

Figure 2:
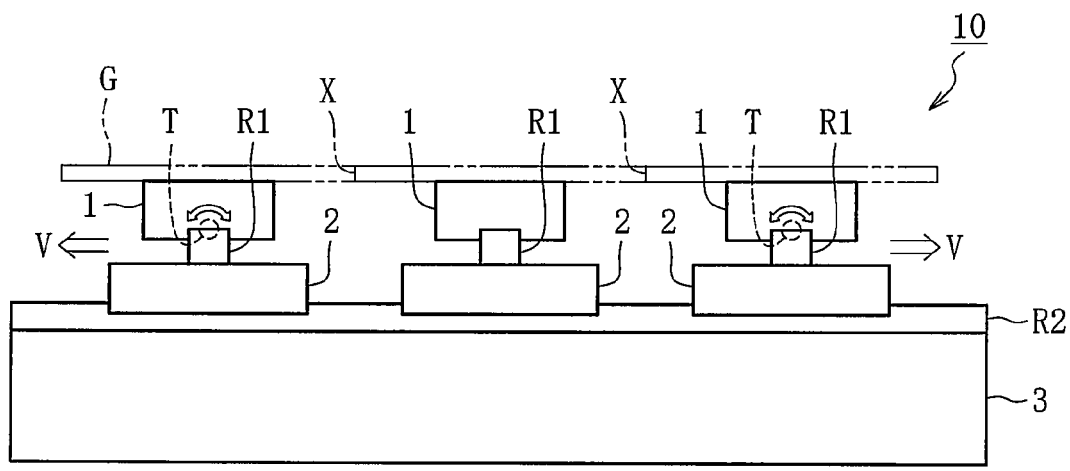
FIG. 2 A side view illustrating the apparatus for cleaving and separating a glass sheet according to the embodiment of the present invention.

FIG. 2 is a side view of the cleaving and separating apparatus 10 as seen in the direction "A" of FIG. 1. As illustrated in FIG. 2, through an operation of drive means (not shown), the guide rail support bodies 2 are guided and moved in the directions "V" along the longitudinal guide rail R2, and hence the adjacent guide rail support bodies 2 are separated from each other. When the guide rail support bodies 2 are moved in the directions "V", the transverse guide rails R1 fixed to the guide rail support bodies 2 and the support members 1 guided and moved by the transverse guide rails R1 are similarly moved in the directions "V". In this manner, the adjacent support members 1 can be separated from each other.

Further, of the support members 1, eight support members 1 provided in all the segment regions other than the segment region P5 (segment regions P1 to P4 and P6 to P9) comprise tilt mechanisms T, respectively, at portions guided by the transverse guide rails R1. Due to actions of the tilt mechanisms T, the eight support members 1 are each rotatable about the corresponding tilt mechanism T (transverse guide rail R1) as a rotation center so that the abutment surface (support surface) of the support member 1 against the glass sheet G is tilted up to an arbitrary angle with respect to a horizontal plane.

Figure 3:
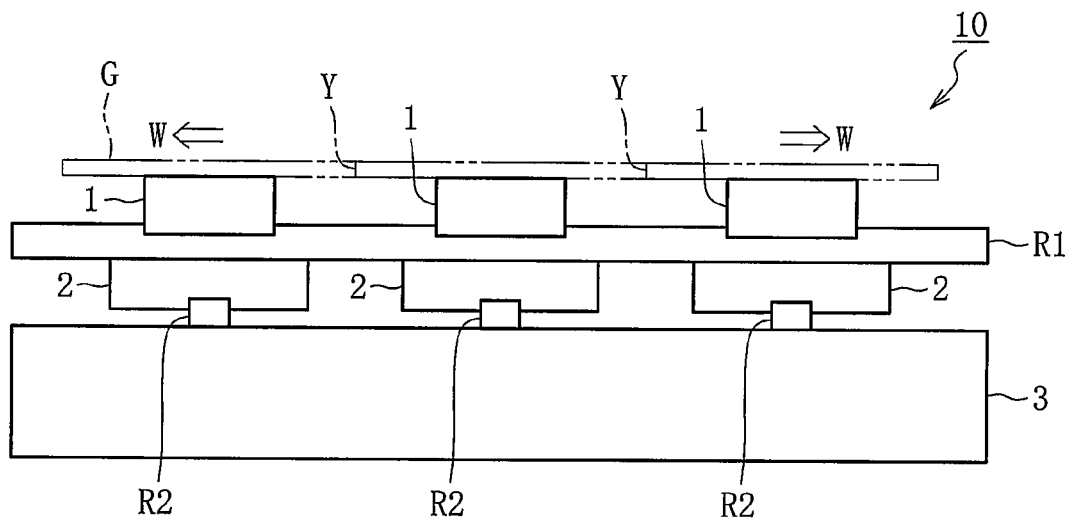
FIG. 3 A side view illustrating the apparatus for cleaving and separating a glass sheet according to the embodiment of the present invention.

FIG. 3 is a side view of the cleaving and separating apparatus 10 as seen in the direction "B" of FIG. 1. As illustrated in FIG. 3, through an operation of drive means (not shown), the support members 1 are guided and moved in the directions "W" along the transverse guide rail R1, and hence the adjacent support members 1 are separated from each other.

In this case, as the drive means for operating the above-mentioned support members 1 and guide rail support bodies 2, there may be used a drive mechanism using a pneumatic or hydraulic drive system, a drive mechanism using a robot or an electric motor, or the like.

Next, a method of cleaving and separating a glass sheet through use of the above-mentioned cleaving and separating apparatus 10 is described with reference to FIGS. 4a to 4h. In the method of cleaving a glass sheet, the glass sheet G is cleaved into nine rectangular pieces of the glass sheet G by a laser cleaving method, and the pieces of the cleaved glass sheet G are separated from one another. Then, pieces of the glass sheet G which cannot be used as a product are discarded. Note that, FIGS. 4a to 4g are plan views of the cleaving and separating apparatus 10, and the transverse guide rails R1, the guide rail support bodies 2, the longitudinal guide rails R2, and the base 3 are omitted from FIGS. 4a to 4g. Further, FIG. 4h is a side view of the cleaving and separating apparatus 10 as seen in the arrow "D" direction of FIG. 4a.

Figure 4A:
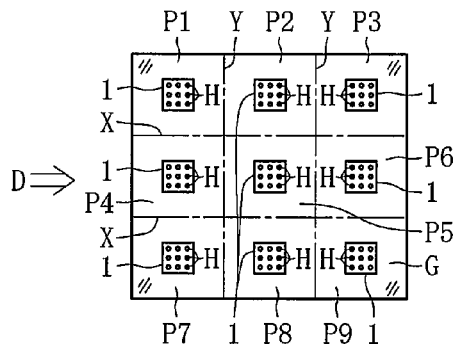
FIG. 4a A plan view illustrating a method of cleaving and separating a glass sheet according to the embodiment of the present invention.

FIG. 4a is a view illustrating the glass sheet G in an initial state in which the glass sheet G is placed on the support members 1 provided to the cleaving and separating apparatus 10 prior to the start of the series of steps. In the initial state, the support members 1 are located at the centers of the corresponding segment regions P1 to P9, which are segmented by the preset transverse cleaving lines X and the preset longitudinal cleaving lines Y.

Figure 4B:
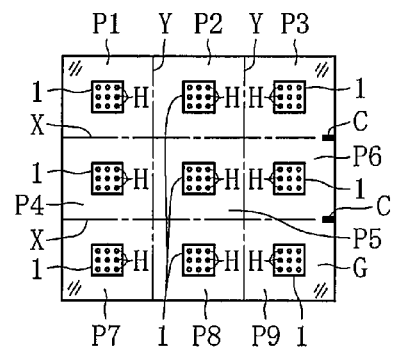
FIG. 4b A plan view illustrating the method of cleaving and separating a glass sheet according to the embodiment of the present invention.

As illustrated in FIG. 4b, a negative pressure is first applied to the glass sheet G through the air holes H provided in the support members 1 so that the support members 1 suck the glass sheet G. After that, under this state, initial cracks C serving as cleaving start points are formed at two intersections between the two preset transverse cleaving lines X and one end surface of the glass sheet G (one end surface orthogonal to the preset transverse cleaving lines X). The initial cracks C can be formed by a mechanical method using a wheel or the like, a method of irradiating the glass sheet G with a short pulse laser, or other methods.

Subsequently, the glass sheet G is moved while heating the glass sheet G through irradiation with a laser beam along the preset transverse cleaving lines X. Following the irradiation with a laser beam, a coolant such as mist water is jetted along the preset transverse cleaving lines X to cool the glass sheet G. Accordingly, a thermal stress is applied to the glass sheet G, and due to the thermal stress, the initial cracks C propagate along the preset transverse cleaving lines X. Through this cleaving step, the glass sheet G is cleaved as illustrated in FIG. 4c, and as a result, transversely cleaved portions XX are formed as portions at which cleaved surfaces of the respective pieces of the cleaved glass sheet G come into proximity to or abutment against each other.

Figure 4C:
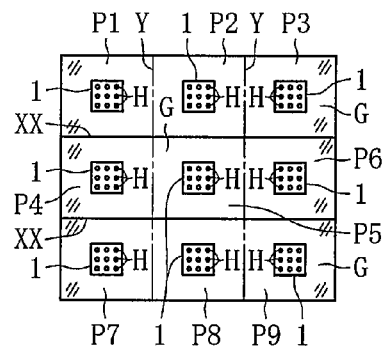
FIG. 4c A plan view illustrating the method of cleaving and separating a glass sheet according to the embodiment of the present invention.
Figure 4D:
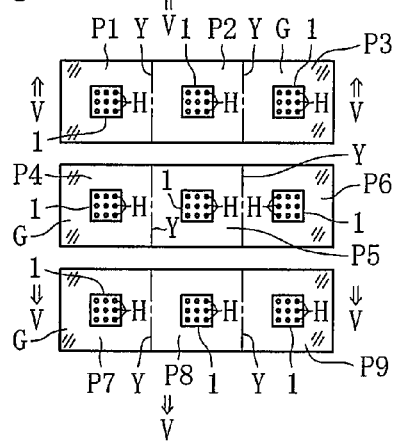
FIG. 4d A plan view illustrating the method of cleaving and separating a glass sheet according to the embodiment of the present invention.

When performing the separation step for the transversely cleaved portions XX under the state of FIG. 4c, the guide rail support bodies 2 (not shown) located in the segment regions P1, P2, P3, P7, P8, and P9 are guided and moved along the longitudinal guide rails R2 as illustrated in FIG. 4d, and hence the support members 1 provided in those segment regions move the pieces of the glass sheet G in the directions "V" of FIG. 4d (directions perpendicular to the transversely cleaved portions XX) while sucking the pieces of the glass sheet G. Along with this operation, the respective pieces of the cleaved glass sheet G are separated from each other, and hence the cleaved surfaces of both the pieces of the glass sheet G are inevitably separated from each other as well. In this case, the separation distance between the cleaved surfaces of the pieces of the cleaved glass sheet G is preferably 1 mm or more in consideration of the need to form initial cracks C serving as the cleaving start points in the cleaving step for the pieces of the glass sheet G along the preset longitudinal cleaving lines Y after the separation step for the transversely cleaved portions XX.

Further, at this time, the pieces of the glass sheet G are sucked by the support members 1, and hence slip is less liable to occur in the abutment surfaces between the pieces of the glass sheet G and the support members 1, which enhances the followability of the movement of the pieces of the glass sheet G with respect to the movement of the support members 1. Accordingly, the effect of separating the cleaved surfaces of the pieces of the glass sheet G can be enhanced in the process of separating the support members 1 provided in the adjacent segment regions. Further, sliding is less liable to occur in the abutment surfaces (support surfaces) between the pieces of the glass sheet G and the support members 1, and hence a scratch or the like is not easily generated in the pieces of the glass sheet G, with the result that degradation in quality of the glass sheet G can be prevented more effectively.

Figure 4E:
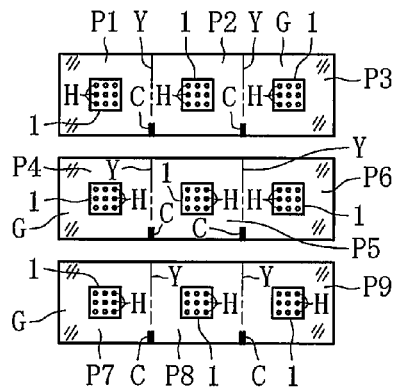
FIG. 4e A plan view illustrating the method of cleaving and separating a glass sheet according to the embodiment of the present invention.

Subsequently, as illustrated in FIG. 4e, initial cracks C serving as cleaving start points along the preset longitudinal cleaving lines Y are formed at two intersections between the two preset longitudinal cleaving lines Y and one end surface of each of the pieces of the glass sheet G which are separated at the transversely cleaved portions XX (one end surface orthogonal to the preset longitudinal cleaving lines Y). Those initial cracks C can also be formed by any one of the above-mentioned methods.

Figure 4F:
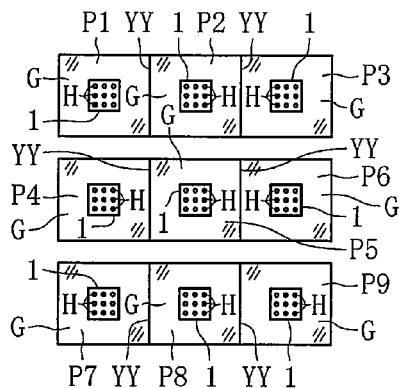
FIG. 4f A plan view illustrating the method of cleaving and separating a glass sheet according to the embodiment of the present invention.

Under the state of FIG. 4e, the cleaving step by the laser cleaving method is performed along the preset longitudinal cleaving lines Y as in the case described above, and accordingly the pieces of the glass sheet G are further cleaved into a state of FIG. 4f. In this manner, longitudinally cleaved portions YY are formed in the pieces of the glass sheet G.

Figure 4G:
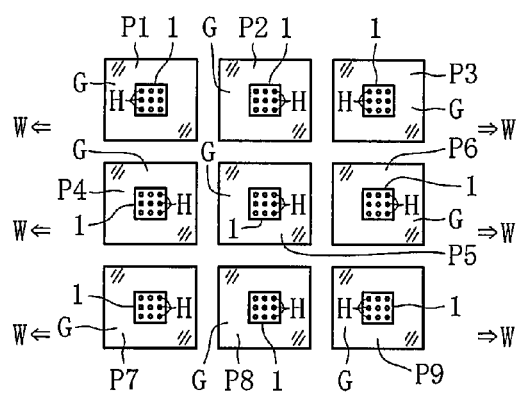
FIG. 4g A plan view illustrating the method of cleaving and separating a glass sheet according to the embodiment of the present invention.
Figure 4H:
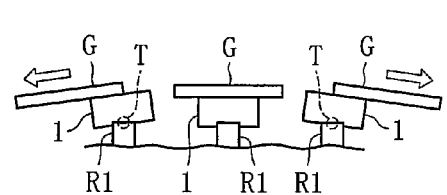
FIG. 4h A side view illustrating the method of cleaving and separating a glass sheet according to the embodiment of the present invention.
Figure 5A:
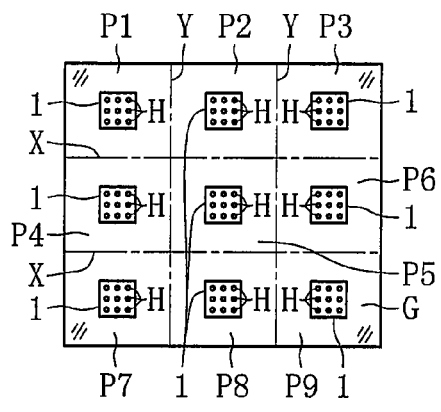
FIG. 5a A plan view illustrating a method of cleaving and separating a glass sheet according to another embodiment of the present invention.
Figure 5B:
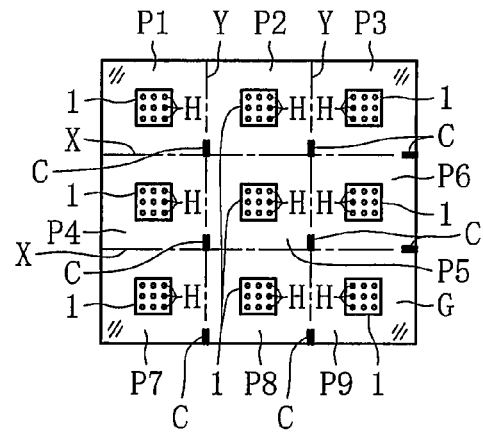
FIG. 5b A plan view illustrating the method of cleaving and separating a glass sheet according to the another embodiment of the present invention.
Figure 5C:
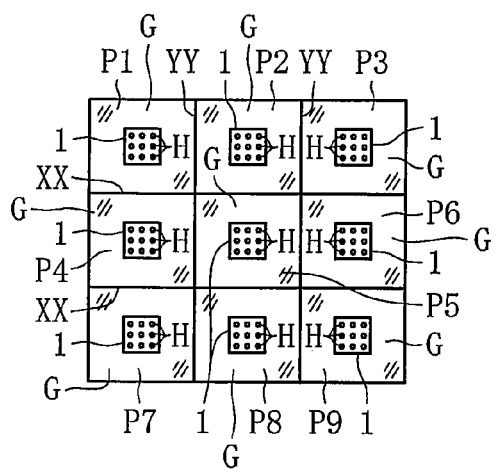
FIG. 5c A plan view illustrating the method of cleaving and separating a glass sheet according to the another embodiment of the present invention.
Figure 5D:
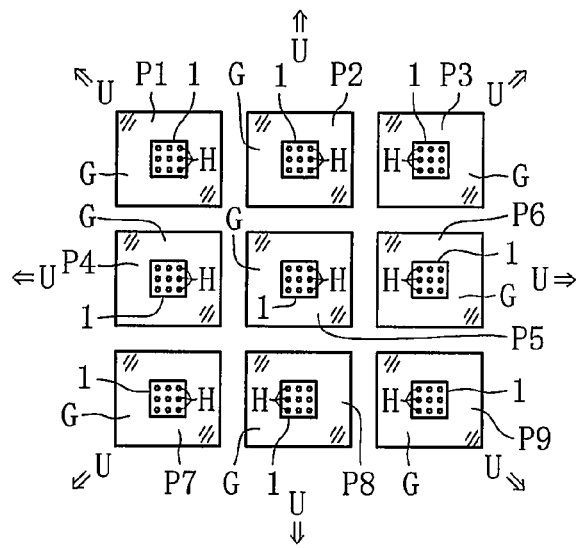
FIG. 5d A plan view illustrating the method of cleaving and separating a glass sheet according to the another embodiment of the present invention.

When performing the separation step for the longitudinally cleaved portions YY under the state of FIG. 4f, the support members 1 provided in the segment regions P1, P3, P4, P6, P7, and P9 are guided along the transverse guide rails R1 (not shown) as illustrated in FIG. 4g, to thereby move the pieces of the glass sheet G in the directions "W" of FIG. 4g (directions perpendicular to the longitudinally cleaved portions YY) while sucking the pieces of the glass sheet G. Accordingly, the respective pieces of the cleaved glass sheet G are separated from each other, and hence the cleaved surfaces of the respective pieces of the glass sheet G are inevitably separated from each other as well.

When all the pieces of the glass sheet G are brought into the state of being separated from each other as illustrated in FIG. 4g, even in a case of picking up the pieces of the cleaved glass sheet G from the support members 1 so as to transfer the pieces of the cleaved glass sheet G into the subsequent steps, collision and sliding between the cleaved surfaces can be avoided. Therefore, a scratch or a fracture can be prevented in the cleaved surfaces, and accordingly the factors of degradation in quality of the glass sheet G can be eliminated. Also in this case, the pieces of the glass sheet G are sucked by the support members 1, and accordingly the effect of separating the cleaved surfaces of the pieces of the glass sheet G can be enhanced in the process of separating the support members 1 provided in the adjacent segment regions. Further, a scratch or the like is not easily generated in the pieces of the glass sheet G at the abutment surfaces between the pieces of the glass sheet G and the support members 1, with the result that the degradation in quality of the glass sheet G can be prevented more effectively.

Further, after the above-mentioned steps are finished, of the plurality of pieces of the cleaved glass sheet G, for example, six pieces of the glass sheet G located in the segment regions P1 to P3 and P7 to P9 have thick selvage portions formed therein. For example, when those pieces of the glass sheet G cannot be used as a product, the suction of the pieces of the glass sheet G through the air holes H is canceled, and due to the actions of the tilt mechanisms T, the abutment surfaces (support surfaces) of the six support members 1 against the pieces of the glass sheet G are tilted with respect to the horizontal plane as illustrated in FIG. 4h, to thereby drop and discard the six pieces of the glass sheet G from the support members 1. Accordingly, it is possible to quickly discard those pieces of the glass sheet G.

In this case, the apparatus for cleaving and separating a glass sheet according to the present invention is not limited to the structure of the apparatus 10 for cleaving and separating a glass sheet that is described in the embodiment described above. For example, in the embodiment described above, three transverse guide rails R1 and three longitudinal guide rails R2 are provided, and nine support members 1 and nine guide rail support bodies 2 are provided. However, the present invention is not limited thereto, and the number of components may be increased and decreased as appropriate. Further, the transverse guide rails R1, the guide rail support bodies 2, and the longitudinal guide rails R2 are not essential components. Therefore, only the support members 1 may be provided and the support members 1 may be moved by a robot or the like. Further, the air holes H formed in the support members 1 may be omitted as well. In addition, the number of the segment regions P1 to P9 is not limited to nine, and may be eight or less or ten or more. The size of the abutment surface between the support member 1 and the glass sheet G may also be changed as appropriate.

In the above-mentioned method of cleaving and separating a glass sheet, the glass sheet G is cleaved along the preset transverse cleaving lines X, and the cleaved surfaces of the pieces of the cleaved glass sheet G are separated from each other at the transversely cleaved portions XX. After that, the pieces of the glass sheet G are cleaved along the preset longitudinal cleaving lines Y, and the cleaved surfaces of the pieces of the cleaved glass sheet G are separated from each other at the longitudinally cleaved portions YY. However, the method of cleaving and separating a glass sheet according to the present invention is not limited to this structure.

As a specific example, FIGS. 5a to 5d illustrate another example of the method of cleaving and separating a glass sheet. In the cleaving and separating method according to the another example, as the cleaving step (FIGS. 5a to 5c), the glass sheet G is cleaved along the preset transverse cleaving lines X and the preset longitudinal cleaving lines Y, and then, as the separation step (FIG. 5d), the separation step for the transversely cleaved portions XX and the separation step for the longitudinally cleaved portions YY are performed. In this separation step, the support members 1 provided in the segment regions P1 to P4 and P6 to P9 are separated from one another by guiding and moving the support members 1 and the guide rail support bodies 2 (not shown) along the transverse guide rails R1 and the longitudinal guide rails R2, respectively, with the segment region P5 assumed as a start point. Accordingly, the respective support members 1 are radially moved in the directions "U" of FIG. 5d, and thus the respective pieces of the cleaved glass sheet G are separated from one another. With this structure, the separation step can be performed simultaneously for the transversely cleaved portions XX and the longitudinally cleaved portions YY, which enhances the working efficiency in the separation step. Further, the timing to suck the glass sheet G against the support members 1 through the air holes H is not limited to that described in the above-mentioned method of cleaving and separating a glass sheet, and the glass sheet G may be sucked only at the time of the separation step.

Note that, in FIGS. 5a to 5d, the components having the same functions and shapes as those in the above-mentioned cleaving and separating method are represented by the same reference symbols as those in FIGS. 4a to 4h, and redundant description is therefore omitted herein. Further, in FIGS. 5a to 5d, the transverse guide rails R1, the guide rail support bodies 2, the longitudinal guide rails R2, and the base 3 are omitted similarly to FIGS. 4a to 4h.

Further, in the method of cleaving and separating a glass sheet which is described as another example, the initial cracks C need to be formed at the intersections between the preset transverse cleaving lines X and the preset longitudinal cleaving lines Y without separating the cleaved surfaces after cleaving the glass sheet G along the preset transverse cleaving lines X. In the case of this cleaving and separating method, the clearance for forming the initial cracks C is not substantially secured between the cleaved surfaces of the pieces of the cleaved glass sheet G, and hence it is preferred that the initial cracks C serving as the start points of cleaving the glass sheet G along the preset longitudinal cleaving lines Y be formed through use of a short pulse laser or the like rather than the mechanical method using a wheel or the like. Further, prior to the cleaving of the glass sheet G along the preset transverse cleaving lines X, the initial cracks C may be provided in advance at the intersections between the preset transverse cleaving lines X and the preset longitudinal cleaving lines Y through use of a short pulse laser.

Further, in the first embodiment described above, the support members 1 provided in all the segment regions other than the segment region P5 comprise the tilt mechanisms T, but the number of the support members 1 comprising the tilt mechanisms T and the direction of tilt of the abutment surface (support surface) against the glass sheet G may be changed as appropriate. For example, in the case of changing the number of the support members 1 comprising the tilt mechanisms T, the support members 1 comprising the tilt mechanisms T may be located only in (I) all the segment regions other than the segment regions P4 to P6 or (II) all the segment regions other than the segment regions P2, P5, and P8.

With the structure (I), when the glass sheet G prior to the cleaving (large-area glass sheet) has thick selvage portions formed at both ends in a direction orthogonal to the preset transverse cleaving lines X, only the pieces of the cleaved glass sheet G which include the selvage portions can be discarded. With the structure (II), when the glass sheet G prior to the cleaving has thick selvage portions formed at both ends in a direction orthogonal to the preset longitudinal cleaving lines Y, only the pieces of the cleaved glass sheet G which include the selvage portions can be discarded.

Further, in the embodiments described above, the support members 1 comprise the tilt mechanisms T at the portions guided by the transverse guide rails R1. Alternatively, the guide rail support bodies 2 may comprise the tilt mechanisms T at portions guided by the longitudinal guide rails R2. Further, in the first embodiment described above, due to the action of the tilt mechanism T, the support member 1 rotates about the transverse guide rail R1 as the rotation center, but may rotate about a rotation center which is an axis extending in parallel to the longitudinal guide rail R2. Note that, even when the guide rail support bodies 2 comprise the tilt mechanisms T, each guide rail support body 2 may rotate about the longitudinal guide rail R2 as the rotation center, or may rotate about a rotation center which is an axis extending in parallel to the transverse guide rail R1.

Further, in the first embodiment described above, after the separation step is performed for the longitudinally cleaved portions YY (stage of FIG. 4g), a part of the plurality of pieces of the cleaved glass sheet G which cannot be used as a product (in the first embodiment, six pieces of the glass sheet G) is discarded. Alternatively, prior to the cleaving of the pieces of the glass sheet G along the preset longitudinal cleaving lines Y after the separation step is performed for the transversely cleaved portions XX (stage of FIG. 4d), a part of the pieces of the glass sheet G which cannot be used as a product may be discarded. Further, a belt conveyor or the like for conveying the pieces of the glass sheet G to be discarded may be provided together with the cleaving and separating apparatus 10.

REFERENCE SIGNS LIST 10 apparatus for cleaving and separating glass sheet
G glass sheet
X preset transverse cleaving line
Y preset longitudinal cleaving line
XX transversely cleaved portion
YY longitudinally cleaved portion
C initial crack
1 support member
2 guide rail support body
3 base
P1 segment region
P2 segment region
P3 segment region
P4 segment region
P5 segment region
P6 segment region
P7 segment region
P8 segment region
P9 segment region
R1 transverse guide rail
R2 longitudinal guide rail
H air hole
T tilt mechanism
V direction of moving guide rail support body (support member)
W direction of moving support member
U direction of moving support member

The invention claimed is:

1. A method of cleaving and separating a glass sheet, the method comprising:
a cleaving step of cleaving the glass sheet along a preset transverse cleaving line for forming a transversely cleaved portion extending in a transverse direction of the glass sheet and along a present longitudinal cleaving line for forming a longitudinally cleaved portion extending in a longitudinal direction of the glass sheet that is orthogonal to the transverse direction by a laser cleaving method; and
a separation step of separating adjacent pieces of the cleaved glass sheet from each other,
wherein the cleaving step is performed under a state in which the glass sheet is located on a plurality of support members provided respectively in segment regions, which are segmented by the preset transverse and longitudinal cleaving lines, and
wherein the separation step is performed by separating the support members from each other in adjacent segment regions, each of the support members being guided and moved by a transverse guide rail extending in the transverse direction and a longitudinal guide rail extending in the longitudinal direction.

2. The method of cleaving and separating a glass sheet according to claim 1, wherein, after the cleaving step is performed along the preset transverse cleaving line, the separation step is performed for the transversely cleaved portion, and then, after the cleaving step is performed along the preset longitudinal cleaving line, the separation step is performed for the longitudinally cleaved portion.

3. The method of cleaving and separating a glass sheet according to claim 2, wherein the support members include air holes and are capable of suctioning and releasing the glass sheet.

4. The method of cleaving and separating a glass sheet according to claim 2, further comprising tilting a support surface of at least one of the support members, which supports any one of pieces of the cleaved glass sheet, with respect to a horizontal plane, to thereby drop and discard at least one of the pieces of the cleaved glass sheet,
wherein the tilting occurs after the separation step.

5. The method of cleaving and separating a glass sheet according to claim 1, wherein, after the cleaving step is performed along the preset transverse cleaving line, the cleaving step is performed along the preset longitudinal cleaving line, and then the separation step for the transversely cleaved portion and the separation step for the longitudinally cleaved portion are performed.

6. The method of cleaving and separating a glass sheet according to claim 5, wherein the support members include air holes and are capable of suctioning and releasing the glass sheet.

7. The method of cleaving and separating a glass sheet according to claim 5, further comprising tilting a support surface of at least one of the support members, which supports any one of pieces of the cleaved glass sheet, with respect to a horizontal plane, to thereby drop and discard at least of the pieces of the cleaved glass sheet,
wherein the tilting occurs after the separation step.

8. The method of cleaving and separating a glass sheet according to claim 1, wherein the support members include air holes and are capable of suctioning and releasing the glass sheet.

9. The method of cleaving and separating a glass sheet according to claim 8, further comprising tilting a support surface of at least one of the support members, which supports any one of pieces of the cleaved glass sheet, with respect to a horizontal plane, to thereby drop and discard at least one of the pieces of the cleaved glass sheet,
wherein the tilting occurs after the separation step.

10. The method of cleaving and separating a glass sheet according to claim 1, further comprising tilting a support surface of at least one of the support members, which supports any one of pieces of the cleaved glass sheet, with respect to a horizontal plane, to thereby drop and discard at least one of the pieces of the cleaved glass sheet,
wherein the tilting occurs after the separation step.

* * * * *